United States Patent [19]
Pawlowski

[11] Patent Number: 5,469,547
[45] Date of Patent: Nov. 21, 1995

[54] ASYNCHRONOUS BUS INTERFACE FOR GENERATING INDIVIDUAL HANDSHAKE SIGNAL FOR EACH DATA TRANSFER BASED ON ASSOCIATED PROPAGATION DELAY WITHIN A TRANSACTION

[75] Inventor: Chester W. Pawlowski, North Chelmsford, Mass.

[73] Assignee: Digital Equipment Corporation, Maynard, Mass.

[21] Appl. No.: 916,327

[22] Filed: Jul. 17, 1992

[51] Int. Cl.⁶ ............................ G06F 13/14; G06F 13/38; G06F 13/42
[52] U.S. Cl. .................. 395/285; 395/550; 395/298; 395/305; 395/878; 364/240; 364/DIG. 1
[58] Field of Search .................................. 395/250, 325, 395/275, 550

[56] References Cited

U.S. PATENT DOCUMENTS

| | | | |
|---|---|---|---|
| 3,229,259 | 1/1966 | Barker et al. | 340/172.5 |
| 3,891,971 | 6/1975 | Hirvela et al. | 340/172.5 |
| 3,919,695 | 11/1975 | Gooding | 340/172.5 |
| 3,962,683 | 6/1976 | Brown et al. | 340/172.5 |
| 3,974,479 | 8/1976 | Kotok et al. | 340/172.5 |
| 4,028,666 | 6/1977 | Suzuki et al. | 340/172.5 |
| 4,153,941 | 5/1979 | Caddell | 444/1 |
| 4,191,998 | 3/1980 | Carmody | 364/200 |
| 4,422,142 | 12/1983 | Inaba et al. | 364/200 |
| 4,675,864 | 6/1987 | Bliek et al. | 370/85 |
| 4,729,090 | 3/1988 | Baba | 364/200 |
| 4,788,656 | 11/1988 | Sternberger | 364/900 |
| 5,079,696 | 1/1992 | Priem et al. | 395/500 |
| 5,097,437 | 3/1992 | Larson | 395/775 |
| 5,109,494 | 4/1992 | Ehlig et al. | 395/325 |
| 5,191,657 | 3/1993 | Ludwig et al. | 395/325 |
| 5,220,651 | 6/1993 | Larson | 395/250 |
| 5,225,374 | 10/1993 | Alderegina et al. | 395/325 |
| 5,237,676 | 8/1993 | Arimilli et al. | 395/550 |
| 5,297,141 | 3/1994 | Marum | 370/85.13 |

OTHER PUBLICATIONS

Borrill, P. L., "Futurebus—the Ultimate in Advanced Bus Systems"; Electro and Mini/Micro Northeast, Apr. 1985, New York, N.Y., US pp. 1–7.

"Asynchronous Bus Controller" IBM Technical Disclosure Bulletin, vol. 34, No. 48, Sep. 1991, Armonk, N.Y., US pp. 426–429.

"VME Upgrades to Futurebus" Computer Systems Europe, vol. 9, No. 2, Feb. 1989, London, GB pp. 67–69.

*Primary Examiner*—Thomas C. Lee
*Assistant Examiner*—Rehana P. Krick
*Attorney, Agent, or Firm*—Mary M. Steubing

[57] ABSTRACT

A method and apparatus is provided for use in an asynchronous bus interface capable of multiple or single width transfers and controlled by handshake signals, in which the bus transaction may include multiple successive data transfers delineated by a data strobe, and in which each data transfer is terminated by a data handshake signal, and in which data transfers for different cycle types incur different propagation delays, including bus buffering apparatus for directing transfers over single and multiple width busses, and an asynchronous bus controller for returning data handshake signals with individualized timing characteristics in response to the master data strobe and the cycle type of the transaction, such that each successive data transfer is completed in the minimum time that propagation delays, as indicated by the cycle type, will allow, in order to maximize bus throughput.

10 Claims, 13 Drawing Sheets

TABLE I

| BUFFER SIGNAL / CYCLE TYPE | 36HOE | 36LOE | 56OE | 56DIR | 44HOE | 44OE | 36HCS | 36LCS |
|---|---|---|---|---|---|---|---|---|
| D64 MASTER, $\overline{RD}$, $\overline{1^{st}\,PART}$ | 1 | — | 0 | x | 0 | 0 | — | — |
| D64 MASTER, $\overline{RD}$, $\overline{1^{st}\,PART}$ | 0 | AD2⊕ODD⊕PARTIAL | $\overline{AD2}$⊕ODD⊕PARTIAL | x | — | — | — | — |
| $\overline{D64}$ MASTER, $\overline{RD}$, $\overline{1^{st}\,PART}$ | 0 | 0 | — | — | 0 | 0 | $\overline{AD2}$⊕ODD⊕PARTIAL | AD2⊕ODD⊕PARTIAL |
| $\overline{D64}$ MASTER, $\overline{RD}$, $\overline{1^{st}\,PART}$ | 0 | 0 | — | 0 | 0 | — | $\overline{AD2}$⊕ODD⊕PARTIAL | AD2⊕ODD⊕PARTIAL |
| $1^{st}$ PARTIAL | 0 | 0 | — | 0 | 0 | — | — | — |

FIG. 5B

FIG. 11 CYCLE TYPE = D̄64, RD, P̄ĀR̄T̄ĪĀL̄, AD2

ASYNCHRONOUS BUS INTERFACE FOR GENERATING INDIVIDUAL HANDSHAKE SIGNAL FOR EACH DATA TRANSFER BASED ON ASSOCIATED PROPAGATION DELAY WITHIN A TRANSACTION

FIELD OF THE INVENTION

The invention pertains to asynchronous handshake generation for an asynchronous bus interface, and particularly to the generation of individually timed asynchronous handshake signals for minimizing data transfer times within an asynchronous bus transaction.

BACKGROUND OF THE INVENTION

Asynchronous busses are used to provide very high speed transfers of information between I/O devices and host computers. Unlike synchronous busses, which rely on a central clock for controlling data exchanges and are thus bandwidth limited by the clock speed, asynchronous busses have no central clock associated with them that I/O devices and host computer I/O modules might use for generating bus transfer signals. Asynchronous busses rely instead on "handshake" signalling. Asynchronous bus speeds are limited only by the speed at which these handshake signals are exchanged.

For an asynchronous bus interface such as the IEEE 896.1-1991 Futurebus+ interface, transfers are divided into phases separated by handshakes. The first phase of a cycle is typically an address/command phase. The bus "master" requesting information asserts address and command information on the bus, and drives an address strobe signal indicating valid information. The "slave" device recognizes the assertion of the address strobe, examines the address/ command information on the bus, and asserts an address "handshake" signal to the master indicating that it has received the information, thus setting up a bus "connection". The master then enters a data phase. The master asserts a data strobe signal to the slave, indicating that either data is available on the bus for the slave to latch, or that the master is ready to receive data from the slave. The slave either reads or asserts data on the bus, and releases a corresponding data handshake signal to indicate it has finished. Multiple data transfers may occur during the data phase of a single bus connection.

In order to maintain maximum bus throughput, the slave must generate data handshake signals as quickly as possible. The slave, however, is also responsible for generating local strobes to strobe data to and from the module after taking appropriate propagation delays into account. During a read, the slave must wait to generate the local read strobe for latching the data until the data has propagated from the slave to the bus. The data handshake must be correspondingly delayed. Likewise, during a write, the slave must wait to generate a local write strobe until the data has propagated from the master to the slave. The data handshake for the write must also be correspondingly delayed. These propagation delays vary depending on output driver enable times, input driver hold times, and on the number of bus transceivers the data must propagate through for a given transfer. In particular, where a master of one bus width is communicating with a slave of a different bus width, bus switching delays are incurred on some of the data transfers during a single data phase, resulting in variable beat delays for one data phase.

In many typical asynchronous bus interface designs, logic is provided to delay data strobe generation and handshakes on all transfers for as long as the longest possible transfer time that might be required for a given data transfer. This method is relatively simple to implement, and guarantees that data will always be valid when latched. However, this method is disadvantageous because valuable time is wasted by handshaking all other data transfers at speeds slower than the actual hardware capability allows, thus decreasing I/O bandwidth and throughput.

Other asynchronous bus interface designs may employ synchronous state machines to vary the timing of the local strobes and handshake signals for a given transfer. These synchronous machines must rely on a local module clock, since there is no central bus clock. Hence, a master handshake signals must be re-synchronized to the local clock, also wasting valuable time. Also, as asynchronous bus transfer speeds increase, the clock speed needed to supply a reasonable transfer time with minimal synchronization delay becomes impractical in terms of noise and metastability considerations.

Therefore, for asynchronous bus interfaces in which propagation delays may vary depending on cycle type, it is desireable to provide asynchronous logic for generating asynchronous bus strobes and handshake signals on an individual basis depending upon the propagation delay incurred for a given data transfer during a bus transaction, in order to minimize transaction times and increase bus bandwidth and throughput.

SUMMARY OF THE INVENTION

According to the principles of the invention, for asynchronous bus interfaces capable of single or multiple width transfers, in which propagation delays vary with cycle type, a method and apparatus is provided for minimizing data transfer times within a bus transaction.

In a broad sense, the invention provides an asynchronous bus interface which generates individually timed data handshake signals for each data transfer of a transaction in response to the cycle type of the transaction.

Accordingly, a method and apparatus is provided for an asynchronous bus interface capable of multiple or single width data transfers. A bus transaction includes address/ command information, and single or multiple successive data transfers delineated by a data strobe, where each data transfer may incur a different propagation delay depending on cycle type. The apparatus consists of means for determining the cycle type of a transfer from the address/ command information, and means for asynchronously generating individually timed slave data handshake signals for each data transfer of a transaction in response to the data strobe and the cycle type.

In a more specific sense, bus buffering apparatus is further provided, consisting of host and asynchronous bus bi-directional data buffers including multiple data sections, and switching transceivers for switching data between the various sections of the host and asynchronous bus buffers.

Also provided is asynchronous logic including means for generating enable and select signals for the bus buffers, means for generating time delayed local read and write data strobes in response to the master data strobe and the cycle type, means for generating hold signals for delaying the data handshake in response to the local data strobes, and an asynchronous state machine for generating data handshakes in response to the master handshake signals and the hold signals, resulting in individual data handshake timing for each data transfer of a bus transaction.

Hence, each successive data transfer is completed in the shortest time that propagation delays, as indicated by cycle type, will allow, thus maximizing bus throughput over single and multiple width busses.

BRIEF DESCRIPTION OF THE DRAWINGS

FIG. 5B is a table of control signal generation for the buffers of FIG. 5A;

DETAILED DESCRIPTION OF THE PREFERRED EMBODIMENT

Figure 1:
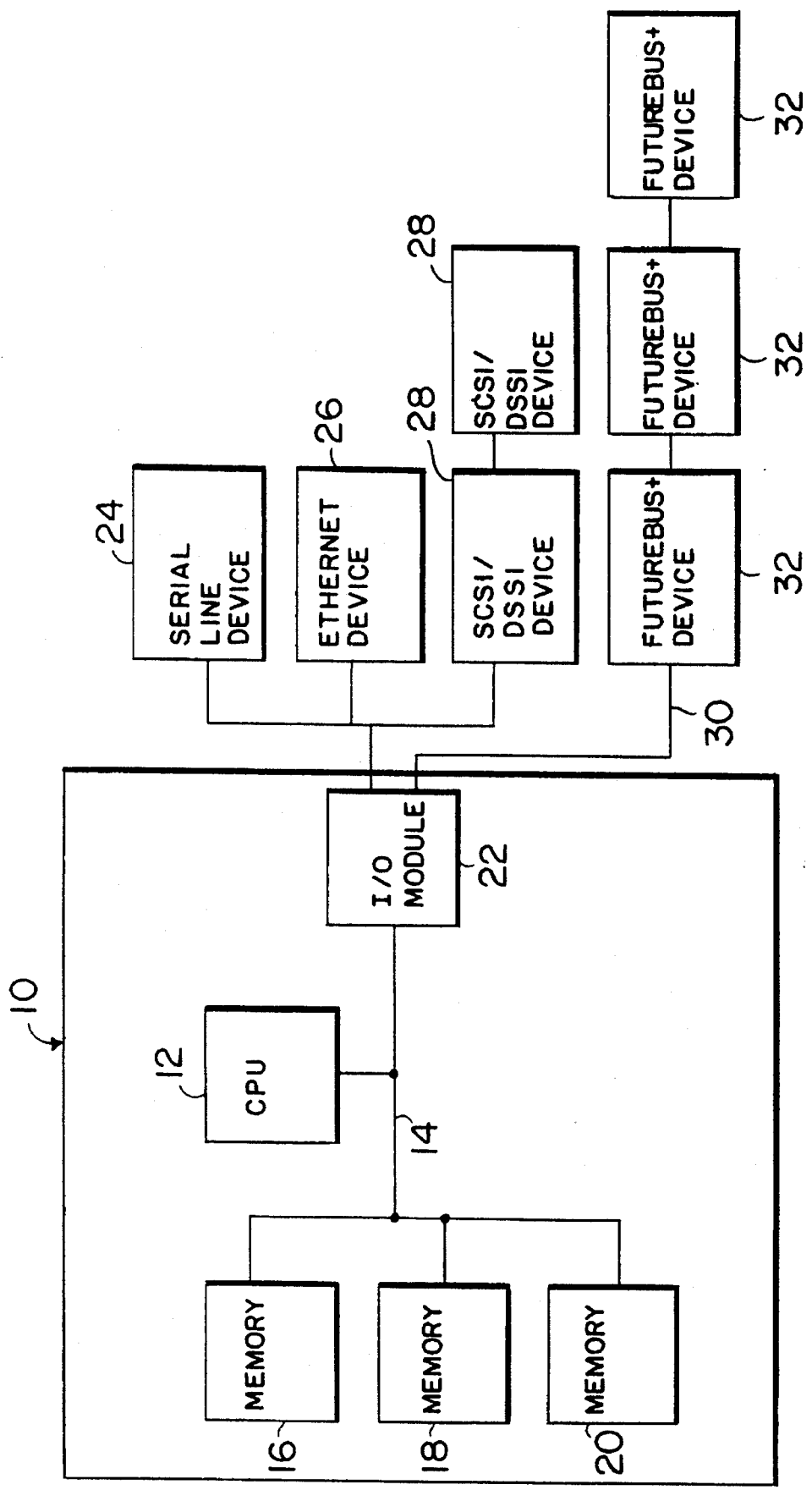
FIG. 1 is a block diagram representing a computer system interconnected to various external peripheral devices according to the principles of the invention.

In FIG. 1, there is shown a computer system 10 capable of communicating with external storage or communications peripherals. Computer system 10 contains a cpu 12 connected by system bus 14, a multiplexed address and data bus, to memory modules 16, 18, and 20. Cpu 12 is also connected by system bus 14 to I/O module 22, which controls communications between computer system 10 and external devices such as serial line device 24, Ethernet device 26, and SCSI/DSSI devices 28. I/O module 22 also supports a high speed parallel asynchronous Futurebus+, on which various Futurebus+ devices 32 reside.

Figure 2:
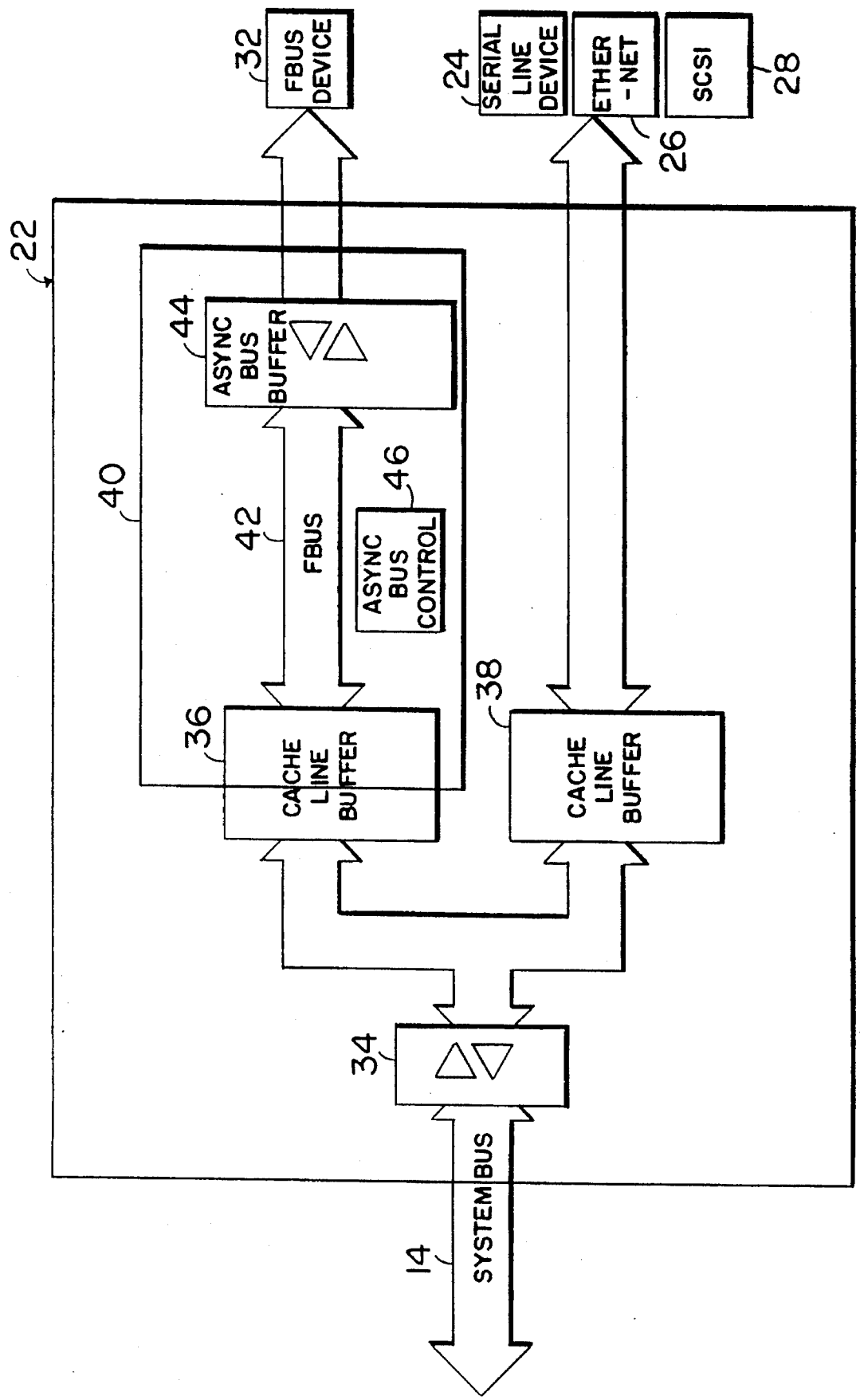
FIG. 2 is a block diagram of the I/O module of FIG. 1.

FIG. 2 depicts I/O module 22 in greater detail. Referring to FIGS. 1 and 2, 128 bit System bus 14 is coupled through transceivers 34 to a pair of dual cache line buffers 36 and 38. These cache line buffers buffer data transfers between the host system bus 14 and I/O devices. Serial line, Ethernet, and SCSI/DSSI devices are coupled to cache line buffer 38, while Futurebus+ devices 32 are coupled to a dedicated cache line buffer 36.

Cache line buffer 36 interfaces system bus 14 to asynchronous bus interface 40. Asynchronous bus interface 40 further includes a 64 bit Fbus 42, asynchronous bus buffer 44, part of cache line buffer 36, and an asynchronous bus controller 46. The Fbus 60 is coupled through the asynchronous bus buffer 44 to external Futurebus+ devices 32. The asynchronous bus controller 46 controls transfers on the Fbus 42.

The asynchronous interface 40 on the I/O module 22 supports Futurebus+ devices compatible with Profile B as described in the IEEE 896.2-1991 specification. The Futurebus+ is an asynchronous parallel bus of up to 256 bits in data width, and is capable of supporting very high speed data transfers between the host and a Futurebus+ device. Futurebus+ transactions generally provide address and command information, and single or multiple data transfers delineated by a master data strobe and terminated by a data handshake.

However, the various types of data transfers which may be executed require different lengths of time. Asynchronous bus interface 40 therefore provides means for determining the cycle type of a transaction, and means for generating individually timed data handshakes for each transfer within a transaction based on cycle type to maximize bus throughput.

The execution of a Futurebus+ transaction requires the recognition of master handshake and command signals, the enabling or selecting of the proper bus buffers, the generation of local strobes for strobing data into the proper buffer after accounting for an appropriate propagation delay, and the return of data handshake signals. These functions are performed by asynchronous bus controller 46.

In order to understand the operation of the invention, the Futurebus+ handshake protocol must be analyzed. In this regard, the asynchronous Futurebus+ protocol relies on a 3 wire address and data handshake for each type of data transaction.

Figure 4:
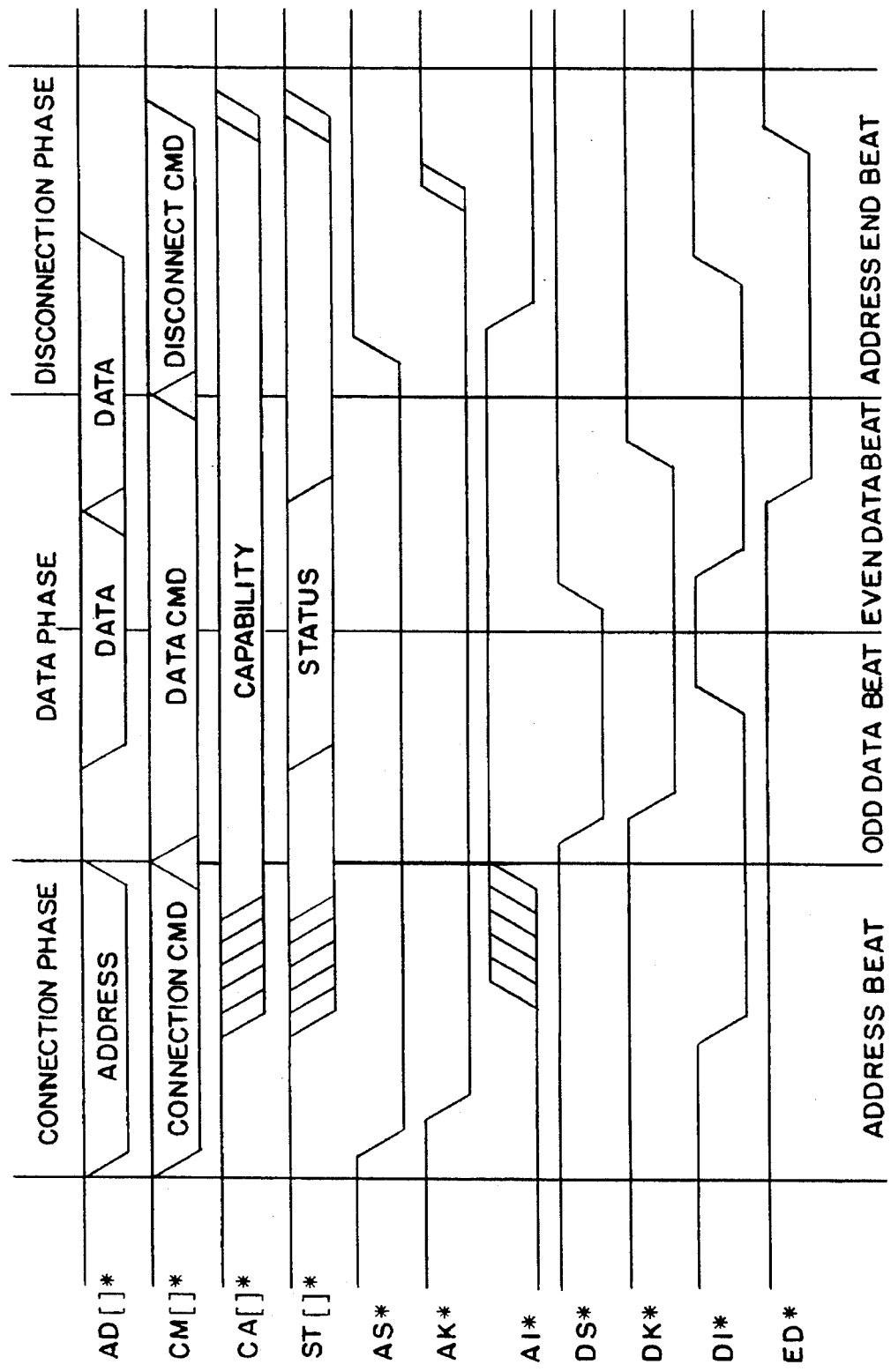
FIG. 4 is a timing diagram of a typical Futurebus+ read transaction.

FIG. 4 is a timing diagram demonstrating such a handshake. A transaction begins with a three wire address handshake, and is followed by single or multiple three wire data handshakes. Each data handshake is referred to as a "beat". To begin a read transaction of two data beats, a master device drives address and command information on the bus, and asserts the Address Strobe signal AS. The slave device responds by driving status information and asserting AK and DI. When the slave device has completed latching the address and command information, which is decoded to indicate cycle type, it deasserts AI, completing the three wire address handshake. The master device then asserts the data strobe DS, beginning the data portion of the cycle. DS indicates that the master is ready to receive data from the slave. The slave, in response to the assertion of DS, asserts DK. When the slave has provided the data requested, it deasserts DI, indicating to the master that data is available. The master then reads the data, and deasserts DS. The deasserting edge of DS indicates to the slave that a new data word is requested. DI is asserted in response to the deassertion of DS. When the slave has provided the new data, it deasserts DK, indicating to the master that data is available. During this data beat, AS is deasserted by the master, indicating that no more data transfers are needed. All handshake signals are then returned to their initial states. Data beats in which DI is deasserted by the slave to indicate valid data are known as "odd beats", while data beats where DK is deasserted by the slave to indicate valid data are known as "even beats". The first data beat of a transfer is always odd. Many data beats may occur during one Futurebus+ transaction.

The asynchronous interface 40 supports two modes of operation, Futurebus+ master and Futurebus+ slave transactions. In Futurebus+ master mode, the I/O module 22 acts as a Futurebus+ master. As a master, the I/O module 22 drives strobes which the Futurebus+ device answers with handshake signals. In this mode, the I/O module is capable of performing 64 bit transactions to 64 bit devices, and 32 bit transactions to 32 bit devices. The transfer speed depends in large part upon the device data handshake. These transfers are always single data transfers, and are thus not a large draw on I/O system bandwidth.

In a Futurebus+ slave transaction, the Futurebus+ device drives the address and data strobes, and the I/O module 22 returns the three wire handshakes. This type of cycle is used for transfers of large blocks of data between a Futurebus+ device and the computer system; therefore, the speeds at which these transfers are completed greatly affects the I/O system bandwidth. In this mode, the time for completing a transaction depends in large part on the speed with which the I/O module 22 can return the data handshake for each data beat. This speed is in turn dependent upon the cycle type of transfer being executed.

Asynchronous bus controller 46 of asynchronous interface 40 provides the means for determining the cycle type of the transaction, and the means for asynchronously generating individually timed data handshake signals for each data transfer in response to the cycle type and the data strobe, so as to minimize the cycle time for each given type of transaction, thus maximizing I/O bandwidth for slave transfers.

Figure 3:
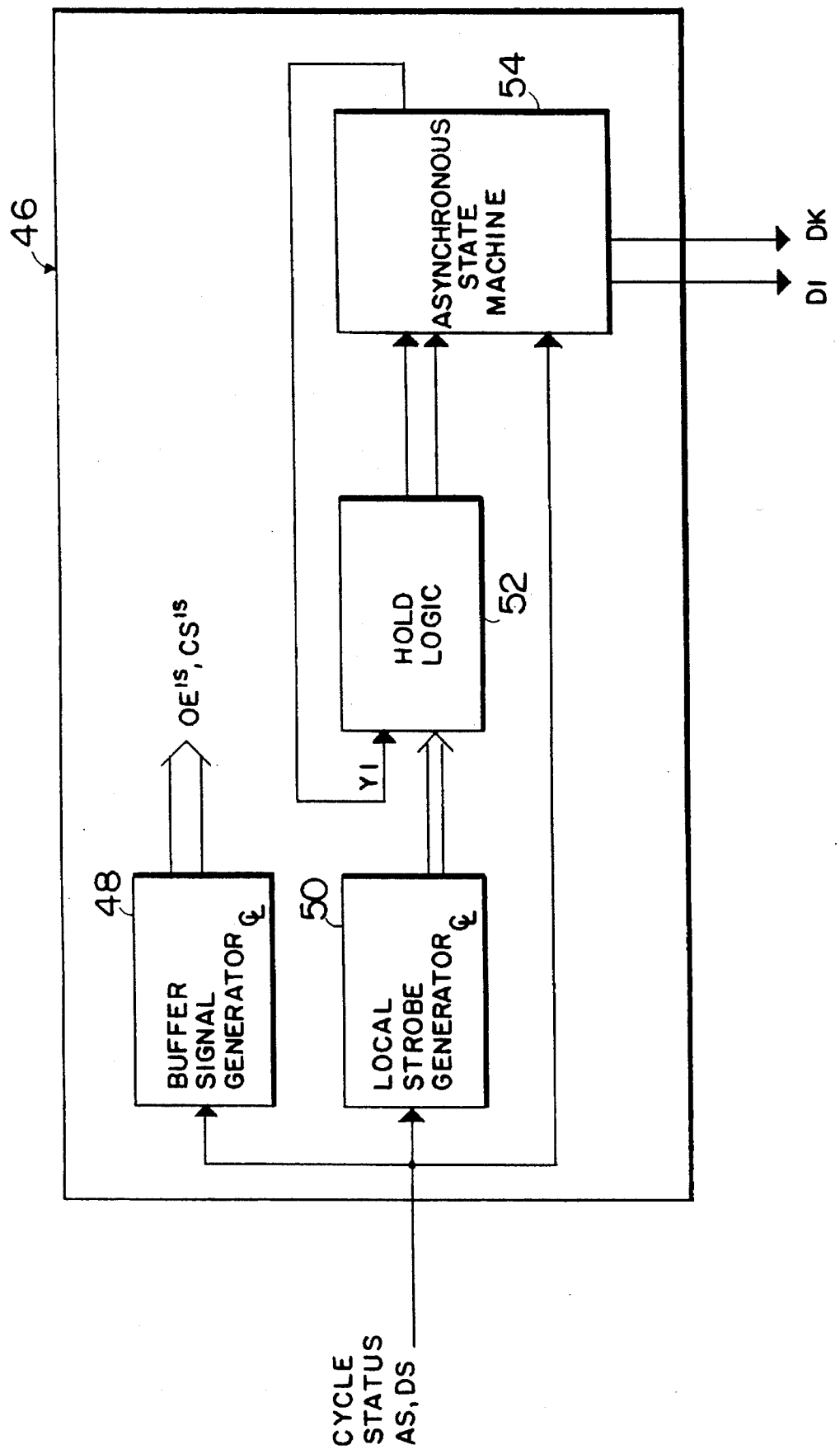
FIG. 3 is a block diagram of the asynchronous bus controller of FIG. 2.

Referring to FIG. 3, asynchronous bus controller 46 of asynchronous bus interface 40 further includes buffer signal generating means 48, local strobe generating means 50, hold logic 52, and asynchronous state machine 54. The Futurebus+ address strobe AS and address/command information obtained during the address/command phase of a transaction are decoded to determine cycle type. The cycle type and data strobe DS are input to buffer signal generator 48 for generating bus driver enables and selects, and to local strobe generator 50, where various different timing strobes are generated according to cycle type. Hold logic 52 monitors the cycle type, and the strobe timing from local strobe generator 50, and generates two HOLD signals; one representing the amount of delay needed on even data beats, and the other representing the amount of delay needed for odd data beats. These HOLD signals are input to asynchronous state machine 54, which generates the data handshake signals DI and DK. The HOLD bits instruct the asynchronous state machine 54 to delay assertion of each respective handshake signal for an appropriate time, thus providing individually timed delays for each data transfer of the transaction.

The operation of asynchronous bus controller 46 as it affects data transfer timing further requires an understanding of the bus structure of the asynchronous interface 40.

Futurebus+ devices may conform to any of a number of supported bus widths. An I/O module 22 must be capable of supporting devices of various widths. In the preferred embodiment, supported Futurebus+ devices are either multiple (64 bits) or single (32 bits) in data bus width. The data path width of the Fbus 60 coupled to cache line buffer 36 is 64 bits. Supported slave transactions include 64 bit transfers between the 64 bit Cache line buffer 36 and a 64 bit Futurebus+ device; 64 bit transfers between the 64 bit Cache line buffer 36 and a 32 bit Futurebus+ device; and 32 bit transfers between the 64 bit Cache line buffer 36 and a 32 bit Futurebus+ device.

Figure 5A:
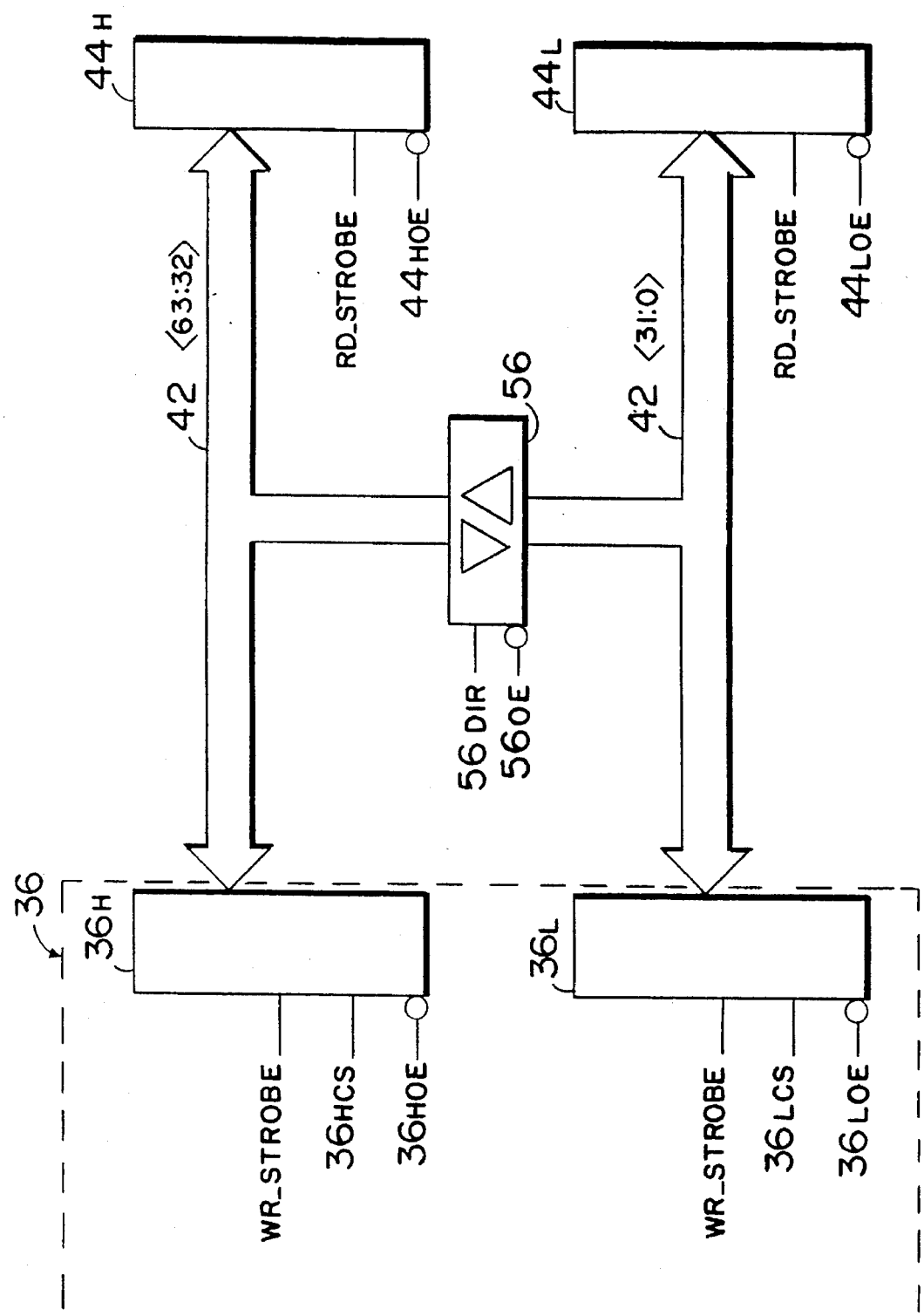
FIG. 5A is a block diagram of the bus structure for the Futurebus+ interface of FIG. 3.

In order to support transfers of different widths, a bus buffering apparatus like that of FIG. 5A is provided. 64 bit cache line buffer 36 includes multiple data sections: an upper bi-directional (32 bit) host data buffer 36H, connected to FBUS 42 <64:32>, and a lower bi-directional (32 bit) host data buffer 36L, connected to FBUS 42 <31:0>. Likewise, asynchronous bus buffer 44 residing on FBUS 42 is divided into multiple data sections, including an upper bi-directional (32 bit) asynchronous bus buffer 44H, connected to FBUS 42 <64:32>, and a lower bi-directional asynchronous bus buffer (32 bit) 62L, connected to FBUS 42 <31:0>. Switching transceiver 56 is connected on one side to FBUS 42 <64:32>, and on the other side to FBUS 42 <31:0>.

It has been found convenient to implement the host data buffers 36H and 36L internal to CMOS cache line buffer chip 36. The FBUS asynchronous bus buffers 44H and 44L as shown are conveniently implemented as Signetics FB2031 bus drivers. It has also been convenient to implement the switching transceiver 56 with 74ACT245 bi-directional transceivers.

This bus buffering apparatus supports different width transfers through enablement or selection of the proper buffers according to the cycle type of a given transaction. Means for generating the buffer signals is conveniently provided by buffer signal generator 48 of asynchronous bus controller 46.

Referring to FIG. 5A, a slave read of a host data buffer 36H, for example, requires that the host data buffer output enable 36HOE and chip select 36HCS be asserted. A slave write to the upper host data buffer 36H requires that the host data buffer chip select line 36HCS be asserted, while the host data buffer output enable 36HOE is deasserted, and the asynchronous bus buffer output enables 44HOE or 44LOE are asserted. Local data strobes WR_STROBE and RD_STROBE latch data into the respective buffers, and will be described in detail later.

Buffers are selectively output enabled (such that they are driving the bus) or selected according to the cycle type of the transfer as shown in table I of FIG. 5B. A '1' in a column indicates that the respective signal is asserted for the cycle type of the row.

As seen in Table I of FIG. 5B, buffer signal generation depends on the cycle type of the transaction being executed. Transactions may be of five different basic types: read transactions controlled by a 64 bit master, write transactions controlled by a 64 bit master, read transactions controlled by a 32 bit master, write transactions controlled by a 32 bit master, and partial transactions.

Buffer signal generator 48 generates a cycle type from command signals decoded during the address/command phase of the transaction. These include AS, address strobe indicating the start of a cycle; RD, indicating whether the cycle is a read or a write; D64, indicating whether the transfer is initiated by a 32 bit or 64 bit device; AD2, a latched address bit indicating whether the starting address of the block of data to be transferred resides on an odd or even doubleword boundary; and 'partial', indicating whether or not the present transfer is a Futurebus+ partial transfer. A status signal 'ODD' is generating during the data phase, indicating whether the current data beat is odd or even.

A partial transaction occurs when the Futurebus+ master elects to send byte mask information to the slave on the first data beat. In this case, a 'partial' command bit will be asserted during the address/command phase, as well as the normal command information indicating read/write and data width. In such a case, the first data beat always consists of a 32 bit write on FBUS 42 <31:0>. The normal transaction follows, starting on the second beat. Hence, the first four rows of table I are qualified by/1st part., indicating that, if the transaction is a partial one, these assertions do not apply on the first beat. The last row of Table I indicates the buffer signal assertions for the first beat of a partial transaction.

When the cycle type indicates a transaction controlled by a 64 bit master, either the host data buffers or the asynchronous bus buffers are driving the bus, while the switching transceiver is tristated. Therefore, as seen in table I, both host data buffer output enables, 36HOE and 36LOE, are asserted, as are host data buffer chip selects 36HCS and 36LCS.

When the cycle type indicates a read transaction controlled by a 32 bit master, the upper host data buffer 36H remains enabled, while the lower host data buffer 36L and the switching transceiver 56 must be selectively enabled. The starting address for a read transfer is obtained during the address/command phase. In the non-partial transfer case, in which the starting address of the transfer is on an even 32 bit double word boundary, i.e. address bit two is low (AD2=0), data is initially read from the lower host data buffer. Lower host data buffer 36L is therefore enabled for odd data beats, and switching transceiver 56 will drive the contents of FBUS 42 <64:32> onto FBUS 42 <31:0> on even data beats. Likewise, for non-partial transfers, if the starting word of the transfer is on an odd double word boundary, i.e. AD2=1, lower host data port 36L will be enabled for even data beats, and switching transceiver 56 will drive the contents of FBUS 42 <64:32> onto FBUS 42 <31:0> on odd data beats. The logical 'XOR' of AD2 with a signal indicating an odd data beat is sufficient as a driver enable switching signal for these nonpartial transactions.

When the cycle type indicates a partial read transfer by a 32 bit master, the data transfers are shifted out one data beat, because the first beat is used for writing the byte mask. Therefore, even double word bounded transfers (AD2=0) require the lower host data buffer 36L to be enabled on the second beat and successive even beats. Likewise, odd double word bounded transfers (AD2=1) will require the lower host data buffer to be enabled on the third and successive odd beats. Thus, for this 32 bit read case, the lower host data buffer 36L and switching transceiver 56 enables occur on opposite beats as compared to the non-partial case. To accommodate this difference, the 'partial' command bit is further logically 'XOR'ed into the driver enable equations.

The resultant buffer signals for a 32 bit master read leave upper host data buffer enable 36HOE asserted, while lower host data buffer enable and chip select 36LOE and 36LCS are asserted for non-partial cycles during odd beats for even bounded data, and switching transceiver enable 56OE and upper host data buffer chip select 36HCS are asserted for non-partial cycles during even beats for even bounded data. For partial cycles, the lower host data buffer and switching transceiver signals are logically inverted.

When the cycle type indicates a write transaction controlled by a 32 bit master, lower asynchronous bus buffer 44L drives FBUS 42 <31:0>, and the switching transceiver 56 is enabled, i.e. 56OE is asserted. Write data is always available at both host data buffers. The host chip selects allow the data to be strobed into the host data ports on the proper beat, according to the same rules concerning data boundaries and partial cycles for read transfers. Thus, for a 32 bit master write, lower asynchronous bus buffer output enable 44LOE and switching transceiver enable 56OE remain asserted, while host data buffer chip selects 36HCS and 36LCS are asserted on alternate beats.

The means for enabling and selecting the various buffers according to cycle type has conveniently been implemented in PAL (programmable array logic) technology, such as a 16L8 series PAL, according to the following equations for the output enables and chip selects shown in Table I of FIG. 5B, where '*' indicates a logical 'and' function, '+' indicates a logical 'or', '/' indicates a logical inverse, '⊕' indicates a logical 'xor', and where inputs are active high, and outputs are active low:

36HOE=RD*/1st part.

36LOE=RD*(D64+(/1st part.*(AD2⊕ODD⊕PARTIAL))

56_OE=1st part.+/D64*/RD+/D64*(/AD2⊕ODD⊕PARTIAL)

56DIR=RD*/1st part.

44HOE=D64*/RD*/1st part.

44LOE=/RD+1st part.

36HCS=/AD2⊕ODD⊕PARTIAL

36LCS=AD2⊕ODD⊕PARTIAL

Due to the relatively high speed of the host data buffer 36 as compared to the speeds of the asynchronous bus buffers 44H and 44L, write transfers from the Futurebus+ master to the host data buffer 36 take more time than read transfers from the host data buffer 36 to the Futurebus+ master. In addition, any transfers for which the switching transceiver 56 must be used to switch data between FBUS 42 <64:32> and FBUS 42 <31:0> take more time than transfers which do not require bus switching. The maximum speed at which a transfer may be completed is, therefore, dependent on whether the cycle type calls for a read or a write, and whether the cycle type requires use of the switching transceiver 56.

The asynchronous bus controller 46 must next provide the local data strobes for strobing the data into the proper buffers, subject to these speed considerations. The means for generating these local data strobes is conveniently provided by local strobe generator 50 of asynchronous bus controller 46.

Figure 6:
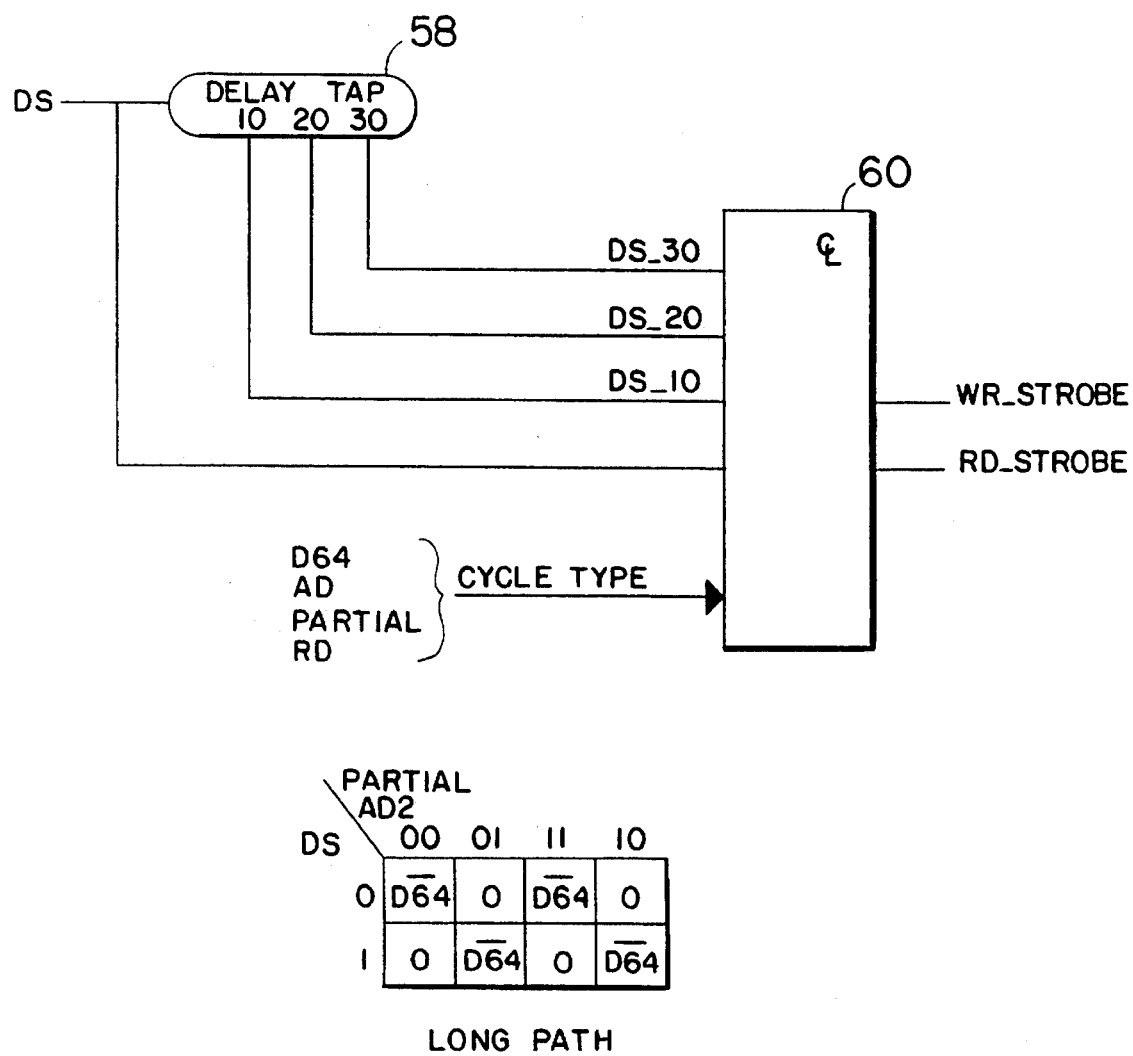
FIG. 6 is a representation of the logical implementation of the outputs of the local strobe generator of FIG. 3.

In FIG. 6 there is shown the local strobe generator 50 of FIG. 3 in further detail. In response to a slave Futurebus+ transfer initiated by a Futurebus+ device, the local strobe generator 50 generates write strobe WR_STROBE for strobing data into the host data port on a write, or read strobe RD_STROBE for strobing data into the latching transceivers on a read. Local strobe generator 50 accepts as input the command signals decoded from the address/command phase at the beginning of a Futurebus+ transfer to determine cycle type. As previously describe, these include AS, address strobe indicating the start of a cycle; RD, indicating whether the cycle is a read or a write; D64, indicating whether the transfer is initiated by a 32 bit or 64 bit device; AD2, a latched address bit indicating whether the data to be transferred resides on an odd or even double word boundary; and partial, indicating whether or not the present transfer is a Futurebus+ partial transfer. Also accepted as input is DS, the Futurebus+ data strobe.

Local strobe generator 50 further contains tap delay 58, accepting as input DS, data strobe, and generating delayed outputs DS_10, DS_20, and DS_30. Signals DS_10, DS_20, and DS_30 are logically equivalent to data strobe DS delayed by 10 ns, 20 ns, and 30 ns respectively. These delayed data strobes are further combined in combinatorial logic included in logic block 60 to generate outputs WR_STROBE, for strobing data into the host data port 36 on a write, and RD_STROBE, for strobing data into the latching transceivers 44H and 44L on a read. The timing of these outputs depends on the transfer cycle type and bus path. As previously described, write cycles by nature take a longer time to execute than read cycles. Also, the bus path required by the cycle may incur extra delay. The cycle address/command information is therefore analyzed to determine which combination of delayed data strobes is required for each transfer during the data phase.

First, the address/command information determining cycle type is analyzed to ascertain whether the cycle will incur extra propagation delay through the switching transceiver 56. This can be determined by observing bits RD, D64, AD2, and Partial. In general, the switching transceiver 56 will be enabled only during transfers between a 32 bit Futurebus+ device and the 64 bit host port. Of these 32 bit transfers, the switching transceiver will always be enabled for write transfers from the Futurebus+ device to the host port. Host port chip selects will enable data into the host port on the proper data beats.

When cycle type indicates a 32 bit read transfer, the switching transceiver will be selectively enabled depending on the status of AD2. When AD2 is high, the first data word is transferred from the high host data port through the switching transceiver to the low FBUS latching transceiver, incurring the extra delay. Subsequent transfers then switch between the low and high data ports. Therefore, when AD2 is high, odd data beats incur the extra switching delay. When AD2 is low, the first data word is transferred from the low host data port, and successive transfers switch between the high and low ports, resulting h extra delay for even data beats.

Further consideration must be given when cycle type indicates a Futurebus+ partial transfer. As previously described, a partial transfer occurs when the Futurebus+ uses the first data beat of a cycle to write byte masking information to the host. This first write is always a 32 bit write on FBUS<31:0>. A normal cycle follows, delayed now by one data beat. A partial cycle is indicated by the command bit "Partial", decoded during the address/command phase. When this bit is set, the logic controlling the bus switching transceiver enable and the strobe delays must "skip" the first data beat. Therefore, for a 32 bit read transfer, if AD2 is high, the first data word must be switched through the switching transceiver, but if the 'Partial' bit indicates a partial transfer, the first data word has been delayed by one data beat. Therefore, for partial transfers where AD2 is high, extra delay is incurred on even data beats; the opposite beats than in the non-partial cycle case. Likewise, for partial transfers where AD2 is low, extra delay is incurred on odd data beats.

The logic observes DS, AD2, partial, and D64 to determine beat for beat which delayed data strobes should be used to generate the device strobes. The Karnaugh map of FIG. 6 shows the generation of the signal "long_path" from these inputs. Long_path is asserted for the exclusive OR of DS, AD2, and partial during 32 bit transfers. Long_path is therefore asserted for any cycle in which the switching transceiver 56 is required.

Means for creating time delayed data strobe signals in response to the Futurebus+ master DS beats must now be provided. The following logical equations are representative of the contents of combinatorial logic block 60 of FIG. 6, where inputs DS, DS_10, DS_20, and DS_30 the Long_path signal are combined to create the properly timed strobe outputs WR_STROBE, for clocking data into the host data ports, and RD_STROBE, for clocking data into the FBUS transceivers. Symbols are as previously described.

WR_STROBE =

/RD * ((DS * (/LONG_PATH * DS_10 * /DS_20 +

LONG_PATH * DS_20 * /DS_30)) +

(/DS * (/LONG_PATH * /DS_10 * DS_20 +

LONG_PATH * /DS_20 * DS_30)))

RD_STROBE = RD * (DS * /DS_10 + /DS * DS_10)

Figure 7:
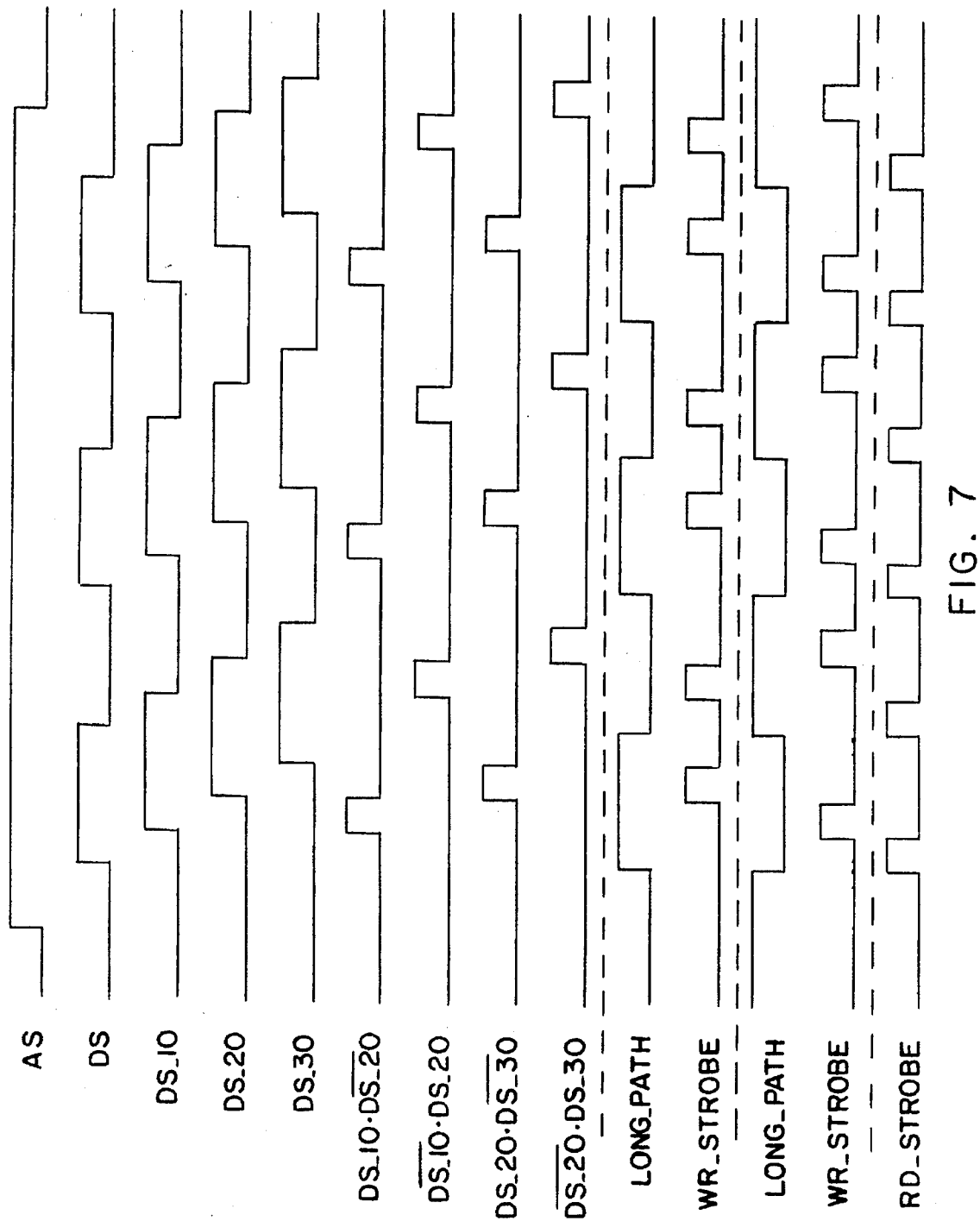
FIG. 7 is a timing diagram representing strobe outputs of FIG. 6 in response to the various possible inputs to the local strobe generator of FIG. 3.

The timing diagram of FIG. 7 provides some examples of the strobe timing. For purposes of the example, all inputs and outputs are shown active high. Below the first dotted line, the WR_STROBE signal is shown for a 32 bit non-partial write to an odd boundary. Since AD2 is high, the odd data beats will incur the switching transceiver delay. Therefore, on odd beats, WR_STROBE is generated from DS_20 and DS_30, and on even beats which may be run faster, WR_STROBE is generated from DS_10 and DS_20. Next, below the second dotted line, the WR_STROBE signal is shown for a 32 bit non-partial write to an even boundary. In this case, AD2 is low, so even data beats will incur the switching transceiver delay. Therefore, WR_STROBE is generated from DS_10 and DS_20 on odd beats, and from DS_20 and DS_30 on even beats. In this way, the data transfer timing for each write cycle type is optimized beat by beat.

The read strobe RD_STROBE is generally faster for two reasons. First, the Cache line buffer host data ports have very little propagation delay associated with them. Second, bus switching on a read can be done such that only one level of delay is incurred at any given time, thus rendering timing the same for 64 and 32 bit transfers.

For example, referring back to FIG. 5A, for a multi-word read from the 64 bit host data buffer 36 to a 32 bit Futurebus+ device from an even address boundary on a non-partial cycle, data is read from the lower host data buffer 36L directly to the lower asynchronous bus buffer 44L while the switching transceiver 56 is off. During this read, the upper host data buffer 36H is enabled so that it can begin asserting data on the upper FBUS 42 <63:32> lines. When the second data beat begins, the lower host data buffer 36L is disabled, and the switching transceiver 56 is enabled, allowing the data already asserted on the upper FBUS 42 <63:32> lines to pass to the lower FBUS 42 <31:0> lines, while incurring only the switching transceiver 56 delay. It is therefore unnecessary to provide different delay times for the read condition. RD_STROBE timing is therefore generated from DS and DS_10, as shown below the third dotted line in FIG. 7.

Referring back to FIG. 3, after data is strobed on each data beat, the I/O module must deassert one of the data handshake signals to indicate to the Futurebus+ master that it may start a new data beat. Means for generating HOLD signals, which are interpreted by an asynchronous state machine 54 for generating the appropriate handshake signals, is conveniently provided by hold logic 52. Hold logic 52 accepts as input WR_STROBE, RD_STROBE, and a state bit Y1. State bit Y1 is basically a copy of the master handshake signal DS during a slave transfer, and will be described again later. From these inputs, HOLD_O is generated for odd data beats, and HOLD_E is generated for even data beats.

Figure 8:
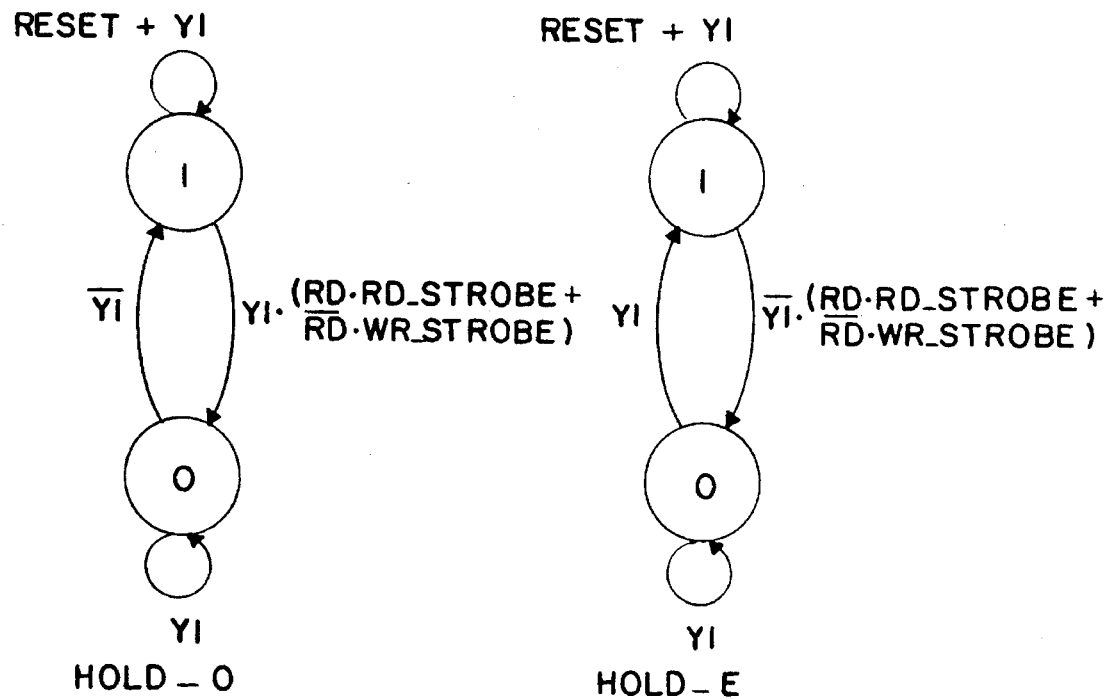
FIG. 8 is a state diagram of the contents of the hold logic of FIG. 3.

The state diagrams for Hold logic 52 are shown in FIG. 8. State bit Y1 is asserted on odd transfers, and deasserted on even transfers. On an odd transfer, HOLD_O is asserted until either the delayed strobe DLY_RD_STROBE, is asserted on a read, or until the strobe WR_STROBE is asserted on a write. DLY_RD_STROBE is a delayed version of the previously described read strobe, RD_STROBE, used to guarantee hold time to the asynchronous bus buffers 44H and 44L. The feedback serves to latch the signal until Y1 is deasserted. Likewise, for even transfers designated by Y1 being in a low state, HOLD_E is similiarly asserted and deasserted. These HOLD bits inform the asynchronous state machine 54 as to when data handshakes may be exchanged to terminate a data transfer on a beat by beat basis. In the example of FIG. 8, HOLD_O and HOLD_E are shown normally 'on', until input conditions as described cause them to transition to a de-asserted state. This logic is also suited to PAL implementation, according to the following equations using symbols as previously described:

HOLD_O=HOLD_O*Y1+Y1*(RD*DLY_RD_STROBE+/ RD*WR_STROBE)

HOLD_E=HOLD_E*/Y1+/Y1*(RD*DLY_RD_STROBE+/ RD*WR_STROBE)

Figure 9:
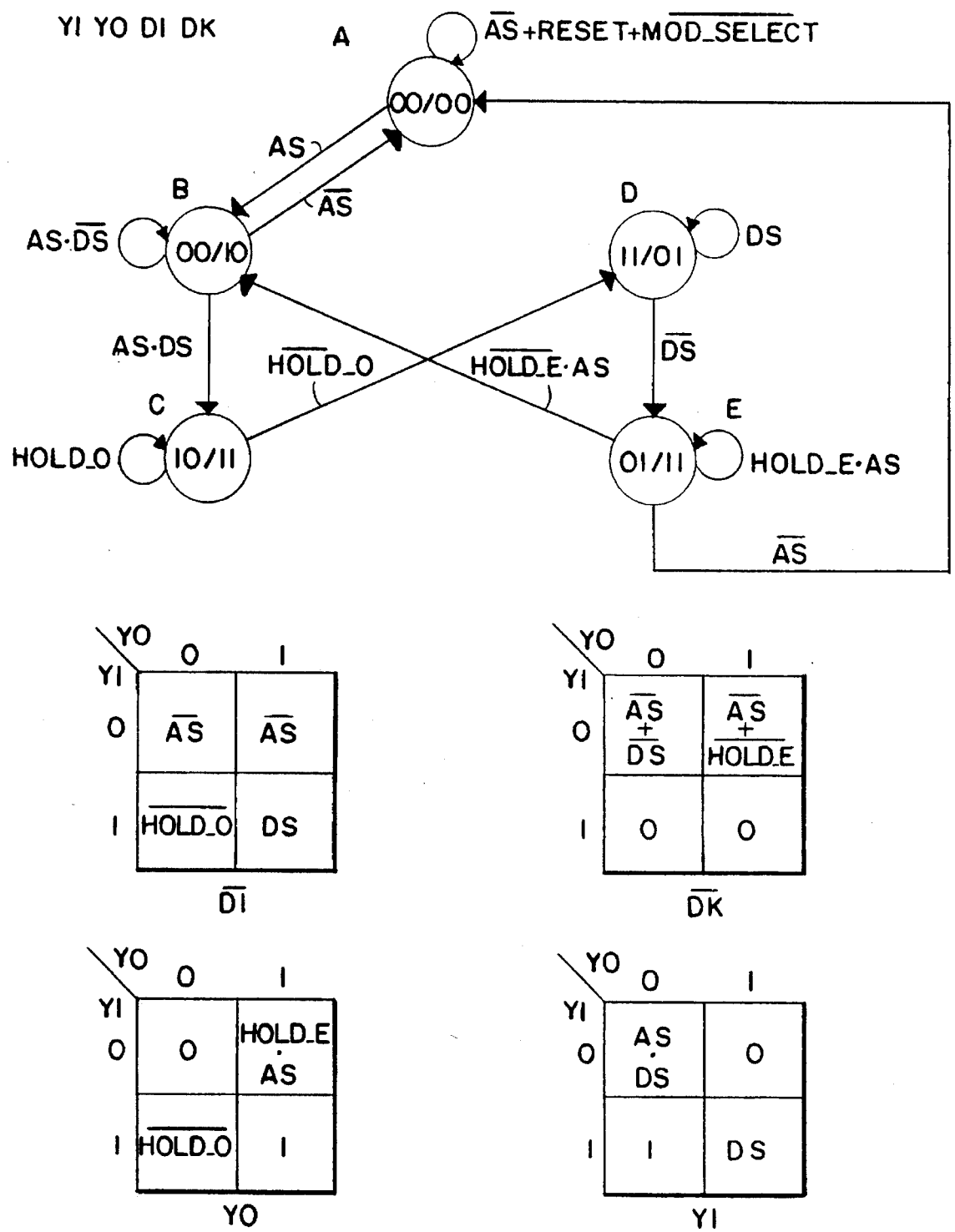
FIG. 9 is the state diagram for the asynchronous state machine of FIG. 3, and the karnaugh map representation of the state variables and outputs of the asynchronous state machine.

Finally, asynchronous state machine 54 is provided to generate Futurebus+ handshake signals in response to Futurebus+ master signals and the HOLD bits. FIG. 9 is a state diagram of the machine. Each circle represents a different possible state. The machine transitions according to the values of state variables Y1 and Y0, shown in each circle to the left of the slash (/). The machine outputs the data handshake signal outputs DI and DK. The values for these handshake signals are shown for each state to the right of the slash. In all cases, a '1' indicates an asserted bit, while a '0' indicates a deasserted bit, regardless of actual assertion values.

Asynchronous machine 54 accepts as input the Futurebus+ master signals AS and DS, and the HOLD logic AS1 outputs HOLD_E and HOLD_O, as well as Reset and Mod_Select bits. Machine 54 outputs the handshake signals DK and DI. The machine is reset to state A, where state variables Y1, Y0=00. It remains in this state until a Futurebus+ master selects the I/O module 22 for a cycle, in which case the Mod_Select input will be asserted, allowing the machine to respond to slave transfers. The Futurebus+ master device causes signal AS to transition to an asserted state. When AS transitions, the machine proceeds to state B, where state variables Y1, Y0 remain 00, but output DI is now asserted in anticipation of completing an odd data beat. The machine waits in state B until master signal DS transitions. On the DS transition, the machine proceeds to state C, where Y1, Y0=10, and DK is asserted in anticipation of completing later even data beats.

The Futurebus+ transfer cycle is now in the midst of the first odd data beat. Machine 54 must now wait for HOLD logic 52 to indicate that data has been transferred successfully before it proceeds to grant the handshake. It therefore waits in state C until bit HOLD_O becomes deasserted. On the HOLD_O deasserting edge, the machine transitions to state D, where state variables Y1, Y0=11, and where output DI is deasserted, signalling to the master that the data beat has been completed. The machine now waits in state D until DS becomes deasserted in response to the handshake. On the deassertion of DS, the machine transitions to state E, now in the midst of an even data beat transfer. In state E the state variable bits Y1 ,Y0=01, and DI is re-asserted for later beats. The machine now monitors bit HOLD_E. When HOLD_E is deasserted, the machine transitions back to state B, where DK is deasserted, completing the even data beat handshake.

The machine continues to cycle from state B through state E until in either B or E, AS is deasserted, indicating the end of the Futurebus+ transfer. In this event, the machine proceeds to reset state A.

Note that state bit Y1 tracks the transitions of DS during a Futurebus+ transfer cycle, and is thus used by the HOLD logic to track slave data beats.

FIG. 9 further contains Karnaugh maps for each state variable and each output, from which the logic functional equations for each variable may be determined. They are as follows, where symbols are used as previously described:

Y1=Y1*DS+/Y0*AS*DS+Y1 * /Y0

Y0=Y1*/HOLD_O+Y0*HOLD_E*AS+Y1*Y0

DI=/Y1*/AS+Y1*/HOLD_O+Y0*Y1*DS

DK=/Y1*/AS+/Y1*Y0*/DS+/Y1*Y0*/HOLD_E

Because the machine is asynchronous, any changing input edge may cause a state transition. When implementing asynchronous state machines, care must be taken in deriving equations from the state diagram such that cover terms are included to prevent glitching, and such that no more than one state variable transitions between successive states. This state machine may be implemented using high speed PAL devices.

Figure 10:
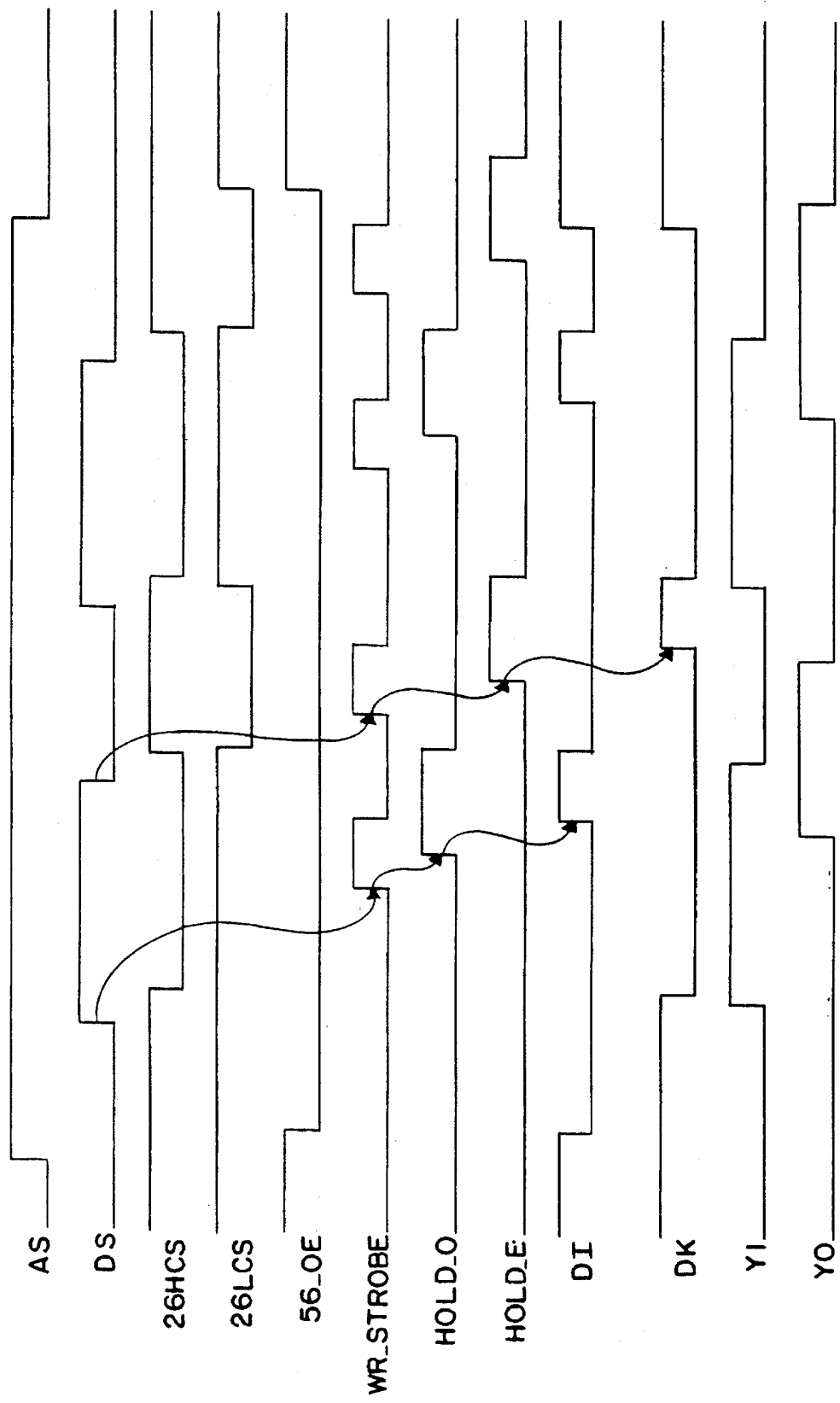
FIG. 10 is a timing diagram of a typical Futurebus+ write cycle as executed by the asynchronous interface.
Figure 11:
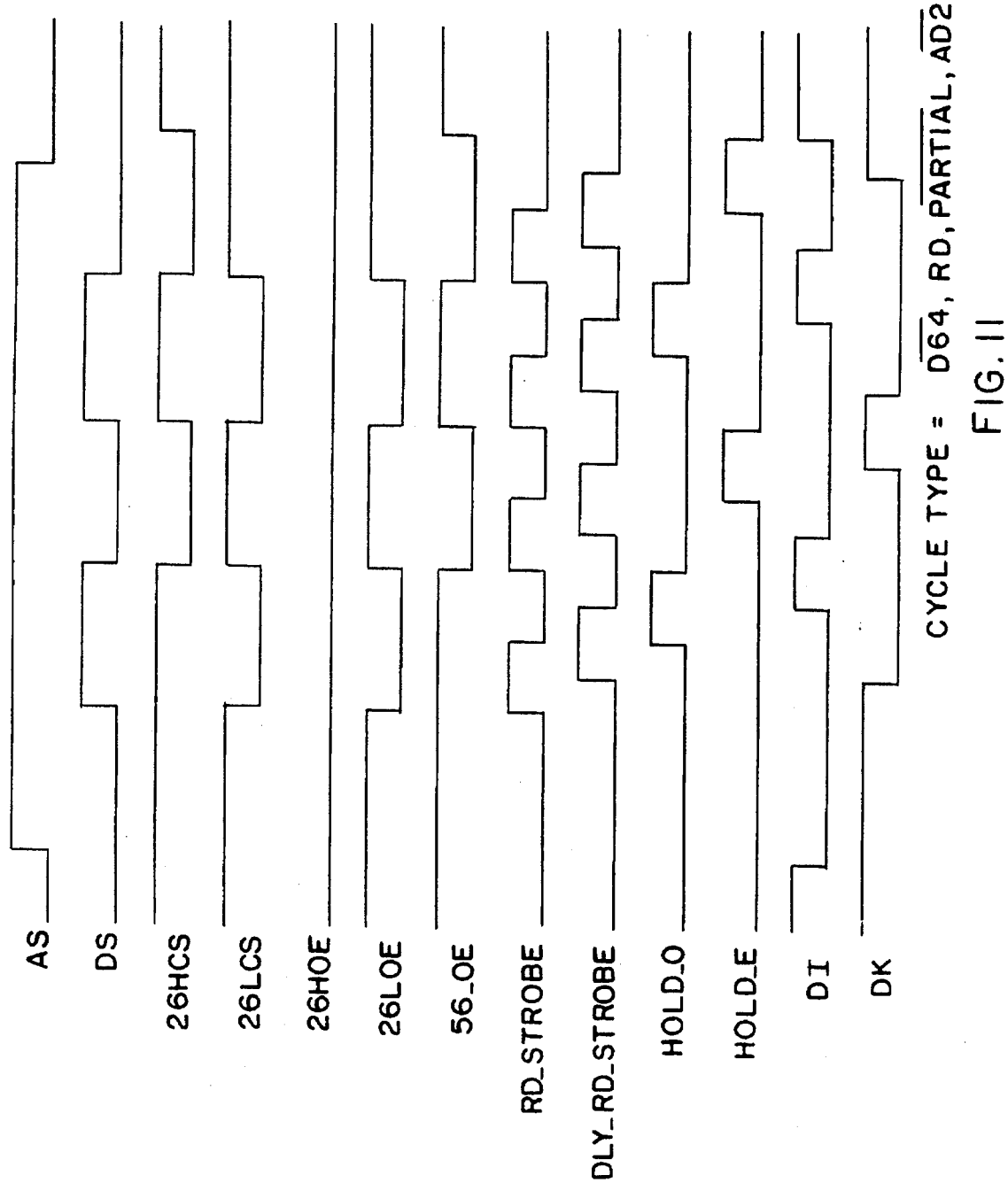
FIG. 11 is a timing diagram of a typical Futurebus+ read cycle as executed by the asynchronous interface.
Figure 12:
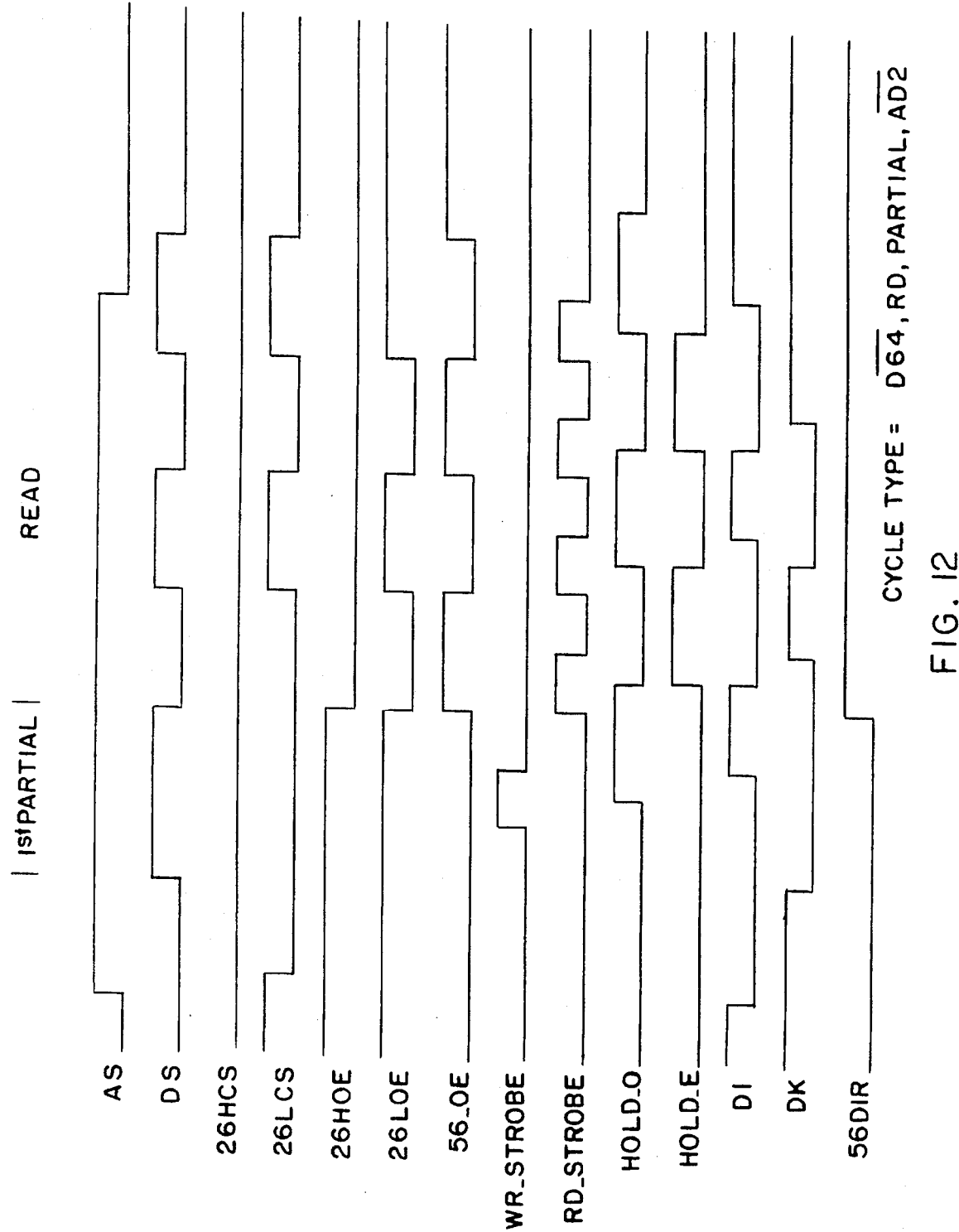
FIG. 12 is a timing diagram of a Futurebus+ partial read cycle as executed by the asynchronous interface.

FIGS. 10–12 are timing diagrams showing how the various different parts of asynchronous controller 46 interact to adjust the timing of the different types of possible Futurebus+ transactions. For purposes of example only, all inputs, and the local strobes WR_STROBE and RD_STROBE, and the state variables Y1 and Y0, are shown active high, while the remaining signals and outputs are shown active low.

FIG. 10 is a non-partial write to an odd-bounded block of addresses, i.e. cycle type indicators D64, RD, and Partial are deasserted, while AD2 is asserted. Hem, the odd addressed data must pass through switching transceiver 56. Thus, the odd data beats are longer. Note that the switching transceiver remains enabled, while host data buffer chip selects 36HCS and 36LCS are alternately asserted, allowing WR_STROBE to strobe data into the ports at the proper times. WR_STROBE is delayed more on odd beats than on even beats. The slave data handshake signal DI is therefore delayed on odd beats as compared to the handshake signal DK on even beats, resulting in the longer odd beats.

FIG. 11 is a timing diagram of a non-partial read of a block of even bounded addresses, i.e. cycle type indicators D64, Partial, and AD2 are deasserted, while RD is asserted. Note that the upper host data buffer remains enabled, while the lower host data buffer and the switching transceiver 56 are alternately enabled on odd and even data beats respectively. Even data is waiting to propagate at the switching transceiver 56 on even beats; thus, only one level of delay is incurred, allowing evenly timed data beats. Note that the RD_STROBE timing and handshake timing is the same for odd and even beats.

FIG. 12 is a timing diagram of a partial read cycle by a 32 bit master to an even address, i.e. cycle type indicators D64 and AD2 are deasserted, while RD and Partial are asserted. Note that the first data beat is a write. A read cycle similar to the previous one then begins, but on the second, even data beat. The switching transceiver 56 direction signal, 56DIR, is initially low, allowing data to flow from the asynchronous bus buffer 44L to the upper host data buffer 36H. Signal 56DIR changes to high after the first beat, allowing data to flow from the upper host data buffer 36H to the asynchronous bus buffer 44L.

Although the invention has been described in connection with the Futurebus+, the asynchronous bus interface of the invention may be implemented for use with various other asynchronous busses. The invention can be used, for example, with a multiplexed asynchronous bus, where address and data information are available at the same time. In addition, the interface of the invention is easily modified to accommodate busses of various different widths. For example, with the addition of extra bus switching transceivers, it is possible to transfer data between a 128 bit host data buffer and 32, 64, or 128 bit asynchronous bus device. The buffer signal generating logic and the local strobe generating logic must be modified to monitor the next most significant address bit as well as the lowest significant address bit in order to provide the proper buffer enablement and strobing. Even wider bus widths may be accommodated.

In the preferred embodiment, asynchronous bus controller 46 is implemented in high speed Pal technology; however, it is possible to provide a discrete implementation, or to adapt the design to VLSI (very large scale integration) chip technology.

It is apparent that, within the scope of the invention, modifications and different arrangements may be made other than as herein disclosed. The present disclosure is merely illustrative, the invention comprehending all variations thereof.

I claim:

1. An asynchronous bus interface for interfacing a computer system to an asynchronous bus, a transaction on said asynchronous bus including address and command information and at least two data transfers delineated by a master data strobe and terminated by a handshake signal, and wherein each said data transfers within said transaction may incur different propagation delays, comprising:

means for determining a cycle type for each said transaction from said address and command information, said cycle type representing data width, transfer direction, and starting address, and means responsive to said means for determining a cycle type, said master data strobe, and said different propagation delays for generating an individually timed slave data handshake signal for each data transfer within a transaction, the individual timing of a slave data handshake signal for a particular data transfer within the transaction being dependent upon the propagation delay associated with the particular data transfer.

2. The apparatus of claim 1, wherein said interface further comprises:

a bi-directional host data buffer comprising multiple data sections;

a bi-directional asynchronous bus buffer comprising multiple data sections;

switching transceivers for electrically connecting data sections of said host buffer to data sections of said asynchronous bus buffer, so that, for a given data transfer, data may be selectively transferred between a given host data section and a given asynchronous bus data section.

3. The apparatus of claim 1, wherein said interface further comprises:

a bi-directional host data buffer comprising upper and lower data sections;

a bi-directional asynchronous bus buffer comprising upper and lower data sections;

switching transceivers for selectively electrically connecting the upper and lower data sections of said host and asynchronous bus buffers.

4. The apparatus of claim 2, wherein said means for generating individually timed slave data handshake signals further comprises:

means responsive to said means for determining cycle type for generating buffer signals for enabling and chip selecting the sections of said host data buffers, and for enabling the sections of said asynchronous bus buffers, and for enabling said switching transceivers;

means responsive to said means for determining cycle type and said master data strobe for generating time delayed local data strobe signals for latching data into said host data port sections and said asynchronous bus buffer sections;

means responsive to said means for generating time delayed local data strobe signals for generating hold bits for delaying the data handshake signals, and an asynchronous state machine responsive to said means for generating hold bits for generating data handshake signals in response to said master data strobe and said hold bits.

5. The apparatus of claim 4 wherein said local strobe generating logic further comprises:

a tap delay line for generating delayed strobes in response to said master data strobe, and combinatorial logic gates for providing local read and write data strobe signals for latching data into said host data port sections and said asynchronous bus buffer sections in response to said delayed strobes and said cycle type.

6. In an asynchronous bus interface for interfacing a computer system to an asynchronous bus, a method of performing transactions on an asynchronous bus, wherein said transaction includes address and command information, and at least two data transfers delineated by a master data strobe and terminated by a handshake signal, and where each said data transfers within said transaction may incur different propagation delays, comprising:

determining a cycle type for each said transaction from said address and command information, said cycle type representing data width, transfer direction, and starting address, and generating in response to said master data strobe and said determined cycle type an individually timed slave data handshake signal for each data transfer within a transaction, the individual timing of a slave data handshake signal for a particular data transfer within the transaction being dependent upon the propagation delay associated with the particular data transfer.

7. The method of claim 6, further comprising the steps of:

providing a bi-directional host data buffer comprising multiple data sections;

providing a bi-directional asynchronous bus buffer comprising multiple data sections;

providing switching transceivers for electrically connecting data sections of said host buffer to data sections of said asynchronous bus buffer, so that, for a given data transfer, data may be selectively transferred between a given host data section and a given asynchronous bus data section.

8. The method of claim 6, wherein said interface further comprises:

a bi-directional host data buffer comprising upper and lower data sections;

a bi-directional asynchronous bus buffer comprising upper and lower data sections;

switching transceivers for selectively electrically connecting the upper and lower data sections of said host and asynchronous bus buffers.

9. The method of claim 7, wherein generating variably timed slave data handshake signals further comprises:

generating buffer signals for enabling and chip selecting the sections of said host data buffers, and for enabling the sections of said asynchronous bus buffers, and for enabling said switching transceivers, in response to said determined cycle type;

generating time delayed local data strobe signals for latching data into said host data port sections and said asynchronous bus buffer sections in response to said master data strobe and said determined cycle type;

generating hold bits for delaying the data handshake signals in response to said generated time delayed local data strobe signals, and generating data handshake signals asynchronously in response to said master data strobe and said generated hold bits.

10. The method of claim 9 wherein generating time delayed local data strobe signals further comprises:

providing a tap delay line for generating delayed strobes in response to said master data strobe, and providing local read and write data strobe signals for latching data into said host data port sections and said asynchronous bus buffer sections in response to said delayed strobes and said cycle type.

* * * * *